3,089,813
METHOD FOR THE TREATMENT OF KETOSIS IN DOMESTIC AND FARM ANIMALS

Alfred Ellsworth Earl, Morristown, N.J., assignor to Ciba Corporation, a corporation of Delaware
No Drawing. Filed June 2, 1958, Ser. No. 738,980
2 Claims. (Cl. 167—53)

This invention relates to and has for its object the provision of a series of pharmaceutical compositions, as well as methods for their use. The compositions of the invention are veterinary compositions and comprise essentially prednisolone 21-lower-alkyl acetate, i.e. trimethylacetate in a pharmaceutical carrier. One may concurrently administer therapeutic materials, such as glucose (or an equivalent sugar) which can be immediately absorbed into the animal body and used for energy and, in ketosis, for oxidizing blood ketones.

The compositions of the invention are highly useful in situations where there is imbalance in the adrenal cortical function of animals; they may, therefore, be used particularly for the treatment of ketosis in animals, such as dairy cows, and may also be used as anti-stress, anti-inflammatory, anti-pyretic, etc., agents in the treatment of domestic or farm animals, such as cattle, dogs, cats, pigs, cows, sheep, horses, birds (e.g. chickens, turkeys, ducks, guinea fowl, pigeons, pheasants, etc.) and other animals which may be subject to difficulties of the type outlined above, or in hypocalcemia or in "downer" cow syndrome.

In short, the compositions of the invention may be used in the same manner and for the same diseases as one uses prednisolone in veterinary medicine. With the esters of the present invention, however, it is found that the treatment of animals is far more effctive, particularly from the point of view of "duration of effect" than is the prednisolone or other such remedies.

More particularly, the compositions of the present invention have been found to be highly effective in the treatment of bovine ketosis, especially since their extended duration of effect enables the animal to obtain a lengthened period of therapy, quite important in a disease of this type. It has been concluded that bovine ketosis may be due to adrenal insufficiency. The cow, at parturition (and immediately following parturition) is affected by stress which results in an increased release of ACTH. Where the stress becomes excessive, the pituitary gland may be overstimulated and become temporarily exhausted. The adrenals then produce insufficient glucocorticoids, the blood sugar decreases and the cow develops ketosis. The compositions of the present invention, containing as an essential ingredient prednisolone trimethylacetate, tend to bring the functioning of the glands into balance and, by maintaining such balance for an optimum longer period of time, enable the animal to adjust its metabolism and overcome its malady. Using a drug which has a much shorter duration of effect, there is in many instances an inadequate time period for the animal to recover metabolic balance; relapse and even death may result. Use of a longer-acting drug is, also, generally advantageous in that it makes administration easier and less time-consuming.

Certain steroids may be longer acting than the ester of the present invention. If steroids are used, having unduly prolonged action, there may be undesirable side effects characteristic of prolonged ACTH suppression. One of these is suppression of lactation in dairy cattle, which is undesirable for practical purposes. The duration of effect of prednisolone trimethylacetate, as taught in the present invention, shows an optimal from a therapeutic and safety aspect.

If it is desirable to do so, one may administer the prednisolone trimethylacetate compositions of the invention in conjunction with administration of glucose. Such dual administration may provide extended and improved effectiveness even when the amount of steroid is administered at a lower dosage. In addition to the practical advantage of utilizing a lowered steroid dosage in such compositions, it is also indicated that the compositions are advantageous in creating an accelerated onset of activity. Other medicinals may also be used in conjunction with the medicinal compositions of the invention. For example, in the treatment of skin conditions, one may supplement use of the inventive compositions with iodochlorhydroxyquin in eczema, allergic dermatitis, etc. Also one may use these compositions with steroids, such as prednisone or prednisolone in treating paralysis (e.g. spastic posterior paralysis in dogs, due to inflammation of the spinal column).

The compositions of the inventions are made up to contain the active ingredients in admixture with pharmaceutical organic or inorganic carriers, particularly those suitable for intramuscular injection. In making up these preparations one may use inert additives, such as water, vegetable oils, etc. One may also include preservatives, stabilizing agents, wetting agents, etc., where appropriate. One may also include, in combination, other therapeutically useful substances. The new compositions may desirably contain about 1 to 50 milligrams per milliliter of prednisolone trimethylacetate when made up in injectionable form. A preferred range of prednisolone trimethylacetate is 10 to 25 milligrams per milliliter. The actual dose administered in therapy depends largely on the condition of the individual animal and the desires of the practicing veterinarian. For bovine ketosis one may generally use dosages of about 50 to 500 milligrams, preferably about 100 to 200 milligrams, which dosages may be augmented by supplemental administration if necessary. When used concurrently with glucose, about ½ the usual dosage is required. In allergic dermatitis, a dosage of about 10 to 20 milligrams, administered intramuscularly, has been found to be highly effective. Where an anti-inflammatory action (such as is desired in the treatment of arthritis) is desired, local injection of joints, tendons and ligaments may require lower dosages, sometimes in the range of 10 to 40 milligrams. Similar therapy is indicated for stress conditions characterized by proteinuria, hemoconcentration and shock. Examples are azorturia, laminitis, general myospasms in racehorses and shock in cattle, known as the "downer" cow syndrome. For treatment of hypocalcemia (e.g. milk fever) one may use as adjunctive therapy the same type of treatment as that used in bovine ketosis. The exhaustion state of the general adaptation syndrome, referred to as the "downer" cow syndrome, responds well to the compositions of the invention as supportive therapy. Prompt remission of symptoms and re-establishment of hemeostasis with return of muscle tone and appetite within 24–36 hours have been observed.

In administering the compositions of the invention, the dosage required may vary with the condition of the animal but can be easily determined in each case by the attending veterinarian. The preferred compositions of the invention, in injectionable suspension form, contain—in addition to the prednisolone trimethylacetate or an equivalent steroid ester in an aqueous medium—(1) a therapeutically acceptable suspending agent, such as methyl cellulose, sodium carboxymethyl cellulose, sodium alginate, acacia, tragacanth, gelatin, guar gum, a Kelcoloid alginate, etc., and (2) a therapeutically acceptable surfactant, such as one of the Pluronics, Span or Tween series, e.g. Tween 21, polyoxyethylene 4-sorbitan monolaurate (a condensation product of sorbitan monolaurate with ethylene oxide in proportion to yield an average of 4 mol proportions of oxyethylene radical per mol ester); Span 20, sorbitan monolaurate (also described in U.S. Patent No. 2,322,820); Tween 80 (described in U.S.P. XV), etc. One may also desirably include in these inventive compositions (3) a material, preferably sodium chloride (or dextrose) for isotonic effect and (4) a preservative, such as merthiolate, chlorbutanol, a paraben, phenol, phenyl mercuric acetate (nitrate or borate), a benzalkomin chloride (i.e. an alkyldimethylbenzylammonium chloride, such as those described in U.S. Patent Nos. 2,086,585; 2,807,131-2; 2,108,765; 2,113,606; 2,152,-047), etc.

Following are specific working examples of the invention. It is to be specifically understood however, that these examples are merely illustrative but in no way limitative of the invention.

*Example 1*

A suspension is prepared having the following composition and containing 25 mg. prednisolone trimethylacetate per milliliter of suspension.

|  | Percent (by weight) |
|---|---|
| Methyl cellulose 100 | 1.0 |
| Sodium carboxymethyl cellulose | 0.3 |
| Tween 80, U.S.P. XV | 0.2 |
| Sodium Chloride | 0.8 |
| Merthiolate | 0.0001 |
| Prednisolone 21-trimethylacetate | 2.5 |
| Water for injections, to make | 100 |

The composition is made by adding the merthiolate to about 80% of the water at 90° C. and stirring until solution is effected, adding the sodium carboxymethyl cellulose, then the methyl cellulose to the merthiolate solution. The resulting mixture is stirred vigorously until a uniform dispersion is obtained, then kept in a freezer for twelve or more hours. After the dispersion has been removed from the freezer and brought to room temperature, the Tween 80 and sodium chloride (in water) are added and enough additional water is then added to bring the suspension up to volume, with stirring utilized to attain uniformity. [In the identical manner, compositions may be prepared using equivalent amounts of other 21-lower alkyl esters, e.g. propionate tertiary butyl acetate, etc.]

*Example 2*

The procedures of Example 1 are followed except that 1% of the prednisolone lower alkyl acetate and 0.2% Tween 21 are substituted for the 2.5% prednisolone lower alkyl acetate and 0.2% Tween 80, respectively, of the reference example.

*Example 3*

A cow (Jersey, 7 years old), suffering from ketosis, was intramuscularly administered a 200 mg. dose of a composition, prepared as described in Example 1. At the time of administration, the feed intake of the animal was poor, milk production was at a rate of 41 lbs. per day, blood glucose was 28 mg./100 ml. and blood ketones was 28 mg./100 ml. Five days later, feed intake was very good, milk production had increased to a rate of 50 lbs. per day, blood glucose was 52 mg./100 ml. and blood ketones had dropped to 5.1 mg./100 ml. In addition, eosinophile count was reduced by ⅔.

The data obtained is tabulated below:

[Received 200 mg. prednisolone trimethylacetate intramuscularly]

| Day | 1 | 2 | 3 | 4 | 5 | 6 |
|---|---|---|---|---|---|---|
| Milk production, lbs | 41 | 36.5 | 45 | 47.5 | 50 | 50 |
| Feed intake | Poor | Good | V.G. | V.G. | V.G. | V.G. |
| Glucose, mg. percent in blood | 28 | 42 | 48 | 48 | 54 | 52 |
| Eosinophile count | 2,200 | 780 | 520 | 1,160 | 900 | 790 |
| Ketones, mg. percent in blood | 28 | 14.1 | 8.7 | 6.0 | 7.1 | 5.1 |

Thus, for veterinary use one may treat an animal, such as a cow, by administering the desired dosage (e.g. 200 mg.) intramuscularly to obtain the desired curative effect.

*Example 4*

A cow (Holstein, 4 years old), suffering from ketosis, was intramuscularly administered a 400 mg. dose of a composition, prepared as described in Example 1. At the time of administration, the feed intake of the animal was poor, milk production was at the rate of 42 lbs. per day, blood glucose was 29.2 mg./100 ml. and blood ketones was 31.7 mg./100 ml. Six days later, feed intake was excellent, milk production had increased to a rate of 51 lbs. per day, blood glucose was 45.7 mg./100 ml. and blood ketones had dropped to 4.3 mg./100 ml. In addition, eosinophile count was substantially reduced. The data obtained is tabulated below:

[Received 400 mg. prednisolone trimethylacetate intramuscularly]

| Day | 1 | 2 | 3 | 4 | 5 | 6 | 7 |
|---|---|---|---|---|---|---|---|
| Milk production | 42 | 39 | 40 | 45.5 | 48.0 | 51.0 | 51.0 |
| Feed intake | Poor | Good | Good | Good | Good | Excl. | Excl. |
| Hematocrit | 51 | 47 | 45 | 44 | 46 | 42 | 41 |
| Glucose, mg. percent | 29.2 | 72.5 | 61.4 | 58.3 | 49.4 | 51.4 | 45.7 |
| Eosinophile count | 470 | 210 | 80 | 113 | 140 | 270 | 390 |
| Ketones, mg. percent | 31.7 | 20.4 | 17.4 | 11.5 | 2.0 | 5.7 | 4.3 |

For veterinary use, one may treat an animal, e.g. cow, by administering a dosage of 400 mg. (or 50, 100, 500 mg.) prednisolone trimethylacetate, intramuscularly, to obtain a curative effect.

*Example 5*

A cow (Ayrshire, 5 years old), suffering from ketosis, was intramuscularly administered a 250 mg. dose of a composition, prepared as described in Example 1. At the time of administration, the feed intake of the animal was poor, milk production was at the rate of 41.5 lbs. per day, blood glucose was 29.9 mg./100 ml. and blood ketones was 23.6 mg./100 ml. Five days later, feed intake was very good, milk production had increased to a rate of 49.0 lbs. per day, blood glucose was 44.4 mg./100 ml. and blood ketones had dropped to 3.0 mg./100 ml. In addition, eosinophile count was substantially reduced. The data obtained is tabulated below:

[Received 250 mg. prednisolone trimethylacetate intramuscularly]

| Day | 1 | 2 | 3 | 4 | 5 | 6 |
|---|---|---|---|---|---|---|
| Milk Production | 41.5 | 38.0 | 41.5 | 44.0 | 47.5 | 49.0 |
| Feed Intake | poor | good | good | V.G. | V.G. | V.G. |
| Glucose, mg. Percent | 29.9 | 59.5 | 54.2 | 48.8 | 47.0 | 44.4 |
| Ketones, mg. Percent | 23.6 | 13.3 | 1.0 | 4.8 | 3.9 | 3.0 |
| Eosinophile Count | 870 | 720 | 230 | 570 | 250 | 480 |

For veterinary use, one may treat an animal, e.g. cow, by administering a dosage of 400 mg. (or 50, 100, 500 mg.) prednisolone trimethylacetate, intramuscularly, to obtain a curative effect.

*Example 6*

A cow (Guernsey, 6 years old), suffering from ketosis, was intramuscularly administered a 100 mg. dose of a composition, prepared as described in Example 1. At the time of administration, the feed intake of the animal was poor, milk production was at the rate of 40 lbs. per day, blood glucose was 25 mg./100 ml. and blood ketones was 30 mg./100 ml. Six days later, feed intake was excellent, milk production had increased to a rate of 62.0 lbs. per day, blood glucose was 51 mg./100 ml. and blood ketones had drooped to 5.0 mg./100 ml.

In addition, eosinophile count was substantially reduced. The data obtained is tabulated below:

[Received 100 mg. prednisolone trimethylacetate intramuscularly]

| Day | 1 | 2 | 3 | 4 | 5 | 6 | 7 |
|---|---|---|---|---|---|---|---|
| Milk production | 40 | 40 | 46.5 | 49.5 | 52.0 | 59.5 | 62.0 |
| Feed intake | Poor | Good | V.G. | V.G. | V.G. | V.G. | Excel. |
| Glucose, mg. percent | 25 | 42 | 35 | 58 | 48 | 52 | 51 |
| Eosinophile count | 1,780 | 820 | 520 | 172 | 850 | 420 | 1,120 |
| Ketones, mg. percent | 30 | 18.3 | 7.9 | 5.4 | 7.2 | 4.1 | 5.0 |

For veterinary use, one may treat an animal, e.g. cow, by administering a dosage of 400 mg. (or 50, 100, 500 mg.) prednisolone trimethylacetate, intramuscularly, to obtain a curative effect.

*Example 7*

A dog (Boxer, male, 1 year), suffering from severe dermatitis of three weeks duration, was intramuscularly administered 15 mg. prednisolone trimethylacetate and in 24 hours full relief from the severe pruritis was evidenced. Animal was returned in one week and the prednisolone trimethylacetate injection was repeated. At the time that the second injection was given there was great improvement in the condition of the skin. The owner was instructed to use a soft brush to aid in removing the scales and crusts. When returned one month later, the entire skin area was normal and hair growth was complete.

*Example 8*

A dog (Beagle, male, 2 years old), suffering from generalized pruritis, dry eczema, was intramuscularly administered 15 mg. prednisolone trimethylacetate. The injection was repeated in 5 days. Scratching was relieved in 24 hours. When animal was seen again five days later the inflamed areas were no longer visible and was very greatly improved.

*Example 9*

A dog (Boxer, female, 4½ years), suffering from arthritis and neuritis, was intramuscularly administered 15 mg. prednisolone trimethylacetate and owner was instructed to return in four days. 10 mg. prednisolone trimethylacetate was given at that time. All evidence of pain gone on second examination, and animal was walking without difficulty. Owner stated that animal showed great improvement on second day.

*Example 10*

A dog (Mixed Cocker, female, 5 years old), suffering from posterior weakness, was intramuscularly administered 15 mg. prednisolone trimethylacetate and no other medication was used. Another injection of prednisolone trimethylacetate was given in four days, 10 mg. intramuscularly.

The typical examples given above show, in a striking manner, the effectiveness of the invention. There is a temporary inhibition of milk secretion which temporarily curbs lactation stress, there is a marked appetite stimulating effect (thus supplying exogenous carbohydrates, protein, etc.) and there is a prompt and prolonged hyperglycemic effect which is desirable since oxidation of the blood ketones is thereby assured. A rumen-stimulating effect and rehydration is also noted.

This invention may be variously otherwise embodied within the scope of the appended claims.

What is claimed is:

1. A method for the treatment of ketosis in domestic and farm animals which comprises intramuscularly administering to said animal a veterinary composition comprising essentially about 1 to about 50 milligrams prednisolone 21-trimethylacetate per milliliter of a liquid pharmaceutical carrier.

2. A method for the treatment of ketosic in domestic and farm animals which comprises intramuscularly administering to said animal a veterinary composition comprising essentially about 10 to about 25 milligrams prednisolone 21-trimethylacetate per milliliter of a liquid pharmaceutical carrier.

References Cited in the file of this patent

UNITED STATES PATENTS

| 2,783,226 | Gould | Feb. 26, 1957 |
| 2,873,271 | Korman et al. | Feb. 10, 1959 |
| 2,880,130 | Johnson et al. | Mar. 31, 1959 |

OTHER REFERENCES

Shaw: Journ. Dairy Science, vol. 39, January–June 1956, pp. 402, 418–426.